(12) United States Patent
Jakobs

(10) Patent No.: US 9,914,352 B2
(45) Date of Patent: Mar. 13, 2018

(54) METHOD FOR THE OPERATION OF A RADIATOR GRILL ARRANGEMENT, RADIATOR GRILL ARRANGEMENT AND VEHICLE

(71) Applicant: Daimler AG, Munich (DE)

(72) Inventor: Holger Jakobs, Dettenhausen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/313,806

(22) PCT Filed: Mar. 26, 2015

(86) PCT No.: PCT/EP2015/000647
§ 371 (c)(1),
(2) Date: Nov. 23, 2016

(87) PCT Pub. No.: WO2015/180807
PCT Pub. Date: Dec. 3, 2015

(65) Prior Publication Data
US 2017/0203649 A1    Jul. 20, 2017

(30) Foreign Application Priority Data

May 27, 2014    (DE) .................. 10 2014 007 910

(51) Int. Cl.
*B60K 11/08*       (2006.01)
*B62D 35/00*      (2006.01)
(52) U.S. Cl.
CPC .......... *B60K 11/085* (2013.01); *B62D 35/005* (2013.01)

(58) Field of Classification Search
CPC ..... B60K 11/085; B60K 13/00; B62D 35/005
See application file for complete search history.

(56) References Cited

U.S. PATENT DOCUMENTS

| 1,950,792 | A | * | 3/1934 | Green | ................. F01P 7/10 165/98 |
| 5,355,059 | A | * | 10/1994 | McMillan | ............. E05F 15/611 318/102 |
| 6,114,819 | A | * | 9/2000 | Porter | ................... B60J 7/0573 296/117 |
| 6,169,379 | B1 | * | 1/2001 | Zhang | ................... B60J 7/0573 318/280 |

(Continued)

FOREIGN PATENT DOCUMENTS

DE   10 2012 012 677 A1   12/2013

OTHER PUBLICATIONS

PCT/EP2015/000647, International Search Report dated Jun. 3, 2015 (Three (3) pages).

*Primary Examiner* — Hau V Phan
(74) *Attorney, Agent, or Firm* — Crowell & Moring LLP

(57) ABSTRACT

A method for operating a radiator grill arrangement of a vehicle is disclosed. The radiator grill arrangement has at least one closure flap mounted for rotation between a closed position and an open position, where the at least one closure flap is positioned by a drive unit. The at least one closure flap is positioned by the drive unit into the closed position, should at least one trigger criterion occur, or the at least one closure flap is positioned by the drive unit from the closed position into the open position and back to the closed position should at least one trigger criterion occur.

8 Claims, 2 Drawing Sheets

(56) References Cited

U.S. PATENT DOCUMENTS

| | | | |
|---|---|---|---|
| 2007/0028219 A1* | 2/2007 | Miller | G05B 23/021 717/124 |
| 2010/0243352 A1* | 9/2010 | Watanabe | B60K 11/085 180/68.1 |
| 2011/0005851 A1* | 1/2011 | Doroghazi | B60K 11/085 180/68.1 |
| 2012/0097464 A1 | 4/2012 | Waugh | |
| 2012/0111652 A1* | 5/2012 | Charnesky | F01P 7/10 180/68.1 |
| 2013/0086839 A1 | 4/2013 | Klop | |
| 2013/0247862 A1* | 9/2013 | Sakai | B60K 11/085 123/188.1 |
| 2014/0039765 A1 | 2/2014 | Charnesky et al. | |
| 2014/0102817 A1 | 4/2014 | Asano et al. | |
| 2014/0216834 A1* | 8/2014 | Elliott | B60K 11/085 180/68.1 |
| 2015/0231962 A1* | 8/2015 | Ruppert | B60K 11/085 180/68.1 |

\* cited by examiner

METHOD FOR THE OPERATION OF A RADIATOR GRILL ARRANGEMENT, RADIATOR GRILL ARRANGEMENT AND VEHICLE

BACKGROUND AND SUMMARY OF THE INVENTION

The invention relates to a method for the operation of a radiator grill arrangement of a vehicle, having at least one closure flap mounted for rotation between a closed position and an open position, wherein the at least one closure flap is positioned by means of a drive unit. Furthermore, the invention relates to a radiator grill arrangement for a vehicle and a vehicle having one such radiator grill arrangement.

A radiator grill arrangement for a vehicle and a method for the operation of the radiator grill arrangement are known from DE 10 2012 012 677 A1. The radiator grill arrangement comprises at least one support frame surrounding a primary air inlet, a number of closure flaps, which are mounted for rotation around a flap rotation axis between a closed position and an open position. Flap levers are moulded or formed on the closure flaps, the flap levers being operatively connected to a sliding bolt, wherein the radiator grill arrangement further comprises an actuating device for the positioning of the closure flaps. Moreover, a flap frame is provided for receiving the closure flaps, the sliding bolt and the actuating drive, wherein the flap frame is formed in two parts and is attached to the support frame of a radiator shield in a non-positive, positive and/or firmly bonded manner.

The object of the invention is to specify a method for the operation of a radiator grill arrangement of a vehicle, a radiator grill arrangement and a vehicle having one such radiator grill arrangement that is an improvement over the prior art.

A method for the operation of a radiator grill arrangement having at least one closure flap mounted for rotation between a closed position and an open position provides that the at least one closure flap is positioned by means of an actuating drive. According to the invention, the at least one closure flap is positioned by means of a drive unit into the closed position, should a trigger criterion occur, or the at least one closure flap is positioned by means of a drive unit from the closed position into the open position and immediately then back into the closed position, should a trigger criterion occur.

The at least one closure flap is positioned into the predetermined closed position, should a trigger criterion occur, whereby an opening or partial opening of the at least one closure flap, in particular when parking the car, is corrected. At the same time, the at least one closure flap is transferred to the closed position, so that a position of the closure flap can be predeterminedly adjusted, in particular with respect to a further operation of the radiator grill arrangement.

By means of the method it can be substantially excluded that an unequal flap position in the closed and/or open position resulting from tampering of the at least one closure flap on the parked car and/or from exposure to snow and/or ice occurs.

In a possible embodiment, the drive unit, at least in the closed position reached, of the at least one closure flap, is automatically moved around a predetermined angle, against a positioning direction, in order to adopt the closed position, wherein the at least one closure flap remains in the closed position.

By moving the drive unit against the positioning direction, the risk of damage to the mechanical drive components and/or the at least one closure flap are or is at least reduced because of a lasting impact of a maximum drive torque of the drive unit. That is to say, by means of the movement of the drive unit against the positioning direction, the mechanical drive components are no longer under permanent pretension, whereby the placement of thermoplastic materials under the influence of temperature is minimized, the components of the mechanical drive being formed from thermoplastic materials.

In particular, a maximum pretension in relatively highly burdened cross-sections of the mechanical drive components is reduced, whereby mechanical burdens such as vibrations for example, which result in the risk of damages, as described above, are at least reduced.

A development of the method provides that starting the engine and/or unlocking the doors of the vehicle are or is used as trigger criterion. That is to say that starting the engine and/or unlocking the door are or is the trigger criterion for the automatic positioning of the at least one closure flap.

In a further possible embodiment, a reference run of the at least one closure flap is carried out, following the positioning of the drive unit around the predetermined angle against the positioning direction. The reference run serves to review the mechanical drive components in connection with the at least one closure flap with regards to adopting the closed and the open position and, where applicable, adjusting it.

Moreover, it is provided that reaching the closed position and the open position by carrying out the reference run is detected by increasing an electric current of the drive unit. Thus, detecting an extreme position of the at least one closure flap is possible, comparatively cheaply, wherein advantageously no additional detection unit is required for determining a position, that is to say an extreme position.

Alternatively or additionally, a position of the drive unit is detected by means of at least one Hall effect sensor, which is integrated into a mechanical component of the drive unit, which can be a direct current motor.

Furthermore, the invention relates to a radiator grill arrangement of a vehicle having at least one closure flap mounted for rotation between a closed and an open position and at least one drive unit for positioning the at least one closure flap. According to the invention, the at least one drive unit positions the at least one closure flap into the closed position should a trigger criterion occur or the at least one drive unit positions the at least one closure flap from the closed position into the open position and immediately then back into the closed position, should a trigger criterion occur.

By means of the radiator grill arrangement and the positioning of the at least one closure flap into the closed position, a position of the at least one closure flap is able to be corrected, because of an opening or partial opening as a result of tampering and/or weather conditions, for example, allowing for further operation of the radiator grill arrangement.

In a possible embodiment, the drive unit, at least at the closed position reached of the at least one closure flap, is able to be moved automatically around a predetermined angle, against a positioning direction, adopting the closed position, wherein the at least one closure flap is positioned in the closed position.

Furthermore, the trigger criterion comprises starting the engine and/or unlocking the door of the vehicle. That is to say that the drive unit positions the at least one closure flap into the closed position on starting the engine and/or unlocking the door.

The invention furthermore relates to a vehicle having such a radiator grill arrangement.

Exemplary embodiments of the invention are illustrated in greater detail below by means of drawings.

DETAILED DESCRIPTION OF THE DRAWINGS

Figure 1:
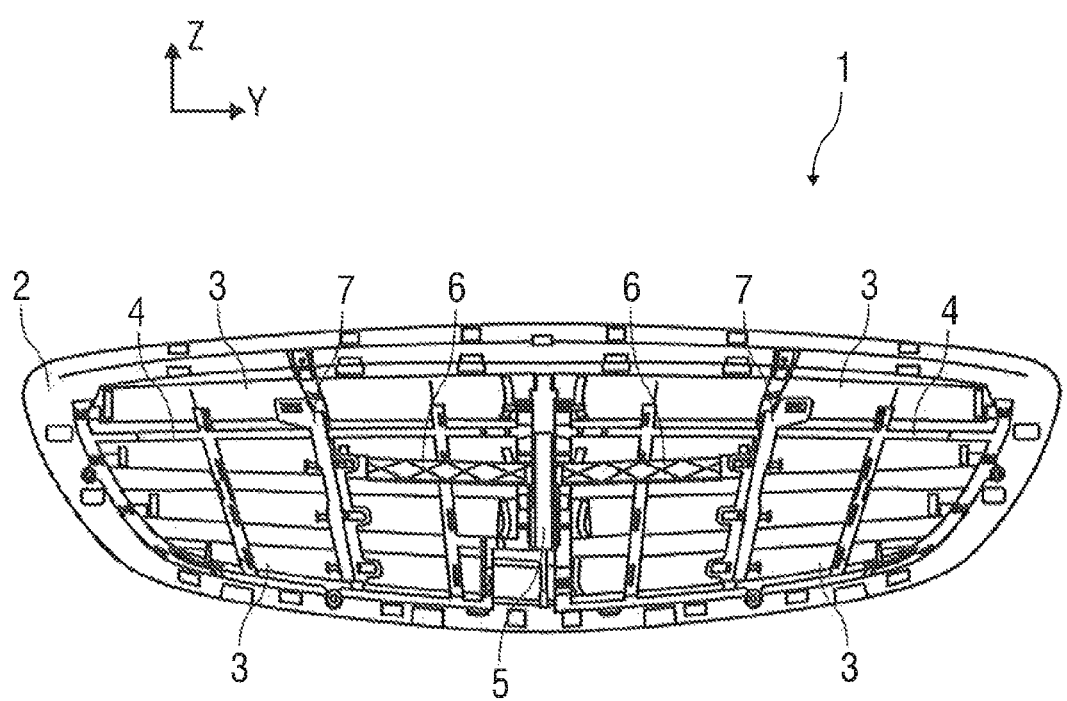
FIG. 1 schematically illustrates a radiator grill arrangement for a vehicle having closure flaps in a closed position.

In FIG. 1, a radiator grill arrangement 1 for a vehicle which is not depicted in more detail is shown in a rear view.

The radiator grill arrangement 1 comprises a support frame 2 surrounding a primary air inlet, a number of closure flaps 3 which have a closed position in the present exemplary embodiment, a flap frame 4, a drive unit 5, two drive levers 6 and two sliding bolts 7.

By means of the radiator grill arrangement 1, the primary inlet opening can be opened and closed depending on operating states of the vehicle. The primary inlet opening is closed, in particular, when there is low heat load or when the combustion engine is switched off, in order to prevent unnecessary cooling by airflow and/or or undesired heat discharge through the primary inlet opening. Moreover, closing the primary inlet opening can lead to a considerable improvement in the drag coefficient, when there is a comparatively high driving speed.

The radiator grill arrangement 1 has two flap rows, which each comprise four closure flaps 3 and are arranged one alongside the other. Thus, the closure flaps 3 are arranged one on top of the other in relation to a vertical axis Z of the vehicle. Furthermore, the closure flaps 3 are arranged in such a way that the longitudinal axes of the closure flaps 3 extend perpendicularly to the vertical axis of the vehicle and parallel to the transverse axis Y of the vehicle.

The closure flaps 3 are mounted for pivoting within their flap rows between the shown closed position and an open position, which is not depicted in more detail.

To adjust the respective closure flap 3, the respective sliding bolt 7 of a flap row is connected to the drive unit 5 via a drive lever 6. The drive unit 5 is centrally arranged in relation to the transverse extension of the radiator grill arrangement 1 and in relation to the transverse axis Y of the vehicle and is allocated to both flap rows.

The drive unit 5 is connected to a control unit, which is not depicted in more detail, by means of which a control signal is produced depending on a surrounding temperature and/or operating temperature of the combustion engine, and this is added to the drive unit for the activation thereof. The closure flaps 3 are opened and closed corresponding to the surrounding temperature and/or the operating temperature.

If a vehicle operation is ended and the vehicle is parked, the drive unit 5 is activated and the closure flaps 3 are closed.

The closure flaps 3 can have unequal positions in the adjusted closed position of the closure flaps 3 as a result of tampering with the closure flaps 3 and/or the impact of ice and snow. For example, some closure flaps 3 are opened or partially opened because of melted ice and/or snow, wherein other closure flaps 3 in turn remain closed.

To be able to preclude a state of unequal closure flap positions as far as possible, in particular when commencing travel, it is provided that the drive unit 5 is activated should a trigger criterion occur and the closure flaps 3 are positioned into the closed position.

The closure flaps 3 are preferably positioned into the closed position, into the open position and back into the closed position should a trigger criterion occur.

Unlocking the doors, manually or remote controlled, and/or starting the engine is given as trigger criterion for positioning the closure flaps 3 into the closed position. That is to say that, in the case of unlocking the vehicle doors and/or when starting the engine of the vehicle, the drive unit 5 is triggered and activated, so that the closure flaps 3 are moved into the closed position.

After the positioning of the closure flaps 3 into the closed position, a reference run of the closure flaps 3 into the extreme closed position and open position can be carried out, as is customary. Reaching the respective extreme position is detected by means of an increase in motor current. A Hall sensor is integrated into a mechanical component of the drive unit 5 by means of which a momentary position of the drive unit 5 can be determined.

If one of the closure flaps 3 is frozen solid or several of the closure flaps 3 are, because of prevalent weather conditions, this state is also detected by means of comparatively high motor current and a corresponding error report is generated.

Furthermore, it is provided that, when an ignition of the vehicle is deactivated, the drive unit 5, in particular a direct current motor, is moved automatically around a predetermined angle against a positioning direction, to adopt the closed position. The drive unit 5 is moved around the predetermined angle against the positioning direction, wherein the closure flaps 3 remain in the closed position.

This opposing movement of the drive unit 5 serves to reduce a comparatively active high force level when positioning the closure flaps 3, in particular into the closed position, in a state of the closure flaps 3 in the closed position and preferably also in the open position as extreme positions. Thus an excessive placement, in particular in plastic, of the mechanical drive components can be prevented.

This excessive placement in plastic results from a self-locking in the worm gear of the mechanical drive components at active high force levels, the worm gear being maintained in place.

Through the opposing movement of the drive unit 5, high drive moment of the drive unit 5 does not affect the closure flaps 3 and/or further components, such that the risk of resulting damages can at least be reduced.

The movement of the drive unit 5 against the positioning direction causes an elastic pretension of the mechanical drive components to be reduced.

By means of the radiator grill arrangement 1 and the method for operating the radiator grill arrangement 1, it is adjusted such that the closure flaps 3 have the same positioning, in particular when commencing driving.

Furthermore, because of the movement of the drive unit 5 against the positioning direction, damage to the closure flaps 3 and/or other components of the mechanical drive components is at least reduced because of the effective relatively high force levels.

Figure 2:
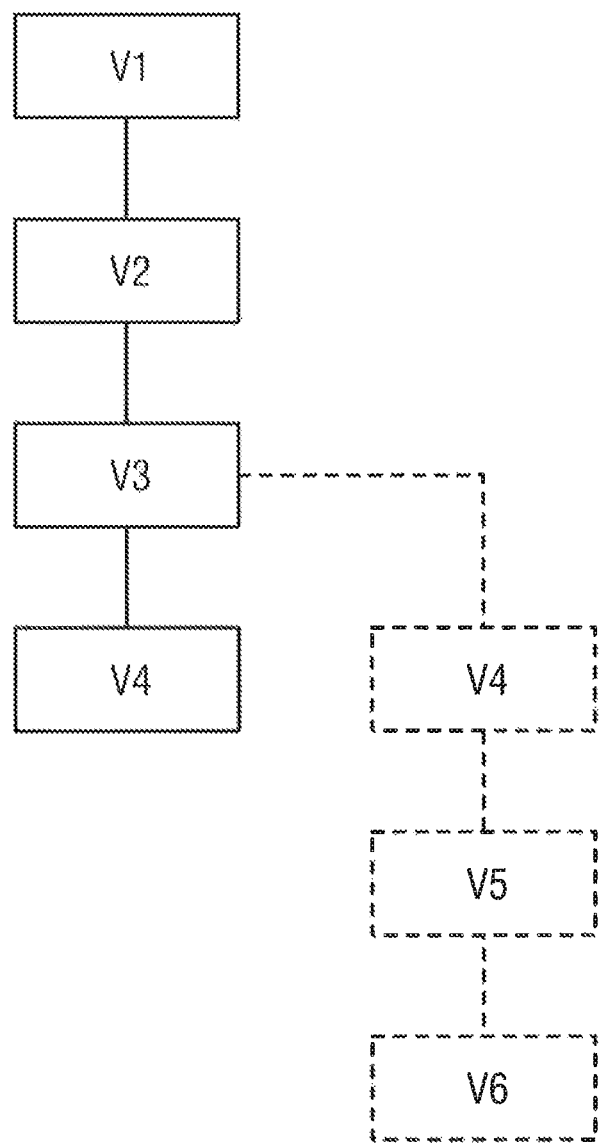
FIG. 2 schematically illustrates a method procedure for actuating the closure flaps.

FIG. 2 shows a method procedure for controlling the closure flaps 3 of the radiator grill arrangement 1.

In an initial method step V1, it is provided that the closure flaps 3 are controlled at one end of the vehicle operation and are positioned into the closed position.

A second method step V2 provides that, when the ignition of the vehicle is deactivated, the drive unit 5 is moved automatically around a predetermined angle against a positioning direction to adopt the closed position.

In a third method step V3, the drive unit 5 is activated on unlocking the doors, manually and/or remote controlled, and/or on starting the engine, and the closure flaps 3 are positioned once again into the closed position, in order to thus correct the differing positions of the closure flaps 3, for example because of prevailing weather conditions.

In an additional fourth method step V4 and in an additional fifth method step V5, it is provided that the closure flaps 3 are subsequently moved into the open position and again into the closed position.

In a sixth method step V6 or optionally in a fourth method step V4, it can be provided that a reference run of the closure flaps 3 known from the prior art is carried out in the extreme positions of closed position and open position.

The invention claimed is:

1. A method for operating a radiator grill arrangement of a vehicle having a closure flap mounted for rotation between a closed position and an open position, wherein the closure flap is positionable by a drive unit, comprising the steps of:
    positioning the closure flap in the closed position by the drive unit on an occurrence of a trigger criterion, wherein the drive unit, when the closure flap reaches the closed position, is moved automatically around a predetermined angle against a positioning direction to adopt the closed position and the closure flap remains in the closed position.

2. The method according to claim 1, wherein the trigger criterion is starting an engine of the vehicle and/or unlocking a door of the vehicle.

3. The method according to claim 1, wherein following the positioning of the closure flap, a reference run of the drive unit and the closure flap is carried out.

4. The method according to claim 3, wherein reaching the closed position and the open position when carrying out the reference run is detected by an increase of an electric current of the drive unit.

5. The method according to claim 1, wherein a momentary position of the drive unit is detected by a Hall sensor.

6. A radiator grill arrangement of a vehicle, comprising:
    a closure flap mounted for rotation between a closed position and an open position; and
    a drive unit, wherein the closure flap is positionable by the drive unit;
    wherein the drive unit positions the closure flap in the closed position on an occurrence of a trigger criterion and wherein the drive unit, when the closure flap reaches the closed position, is movable automatically around a predetermined angle against a positioning direction to adopt the closed position and the closure flap remains in the closed position.

7. The radiator grill arrangement according to claim 6, wherein the trigger criterion is starting an engine of the vehicle and/or unlocking a door of the vehicle.

8. A vehicle, comprising a radiator grill arrangement according to claim 6.

* * * * *